United States Patent
Ross et al.

(10) Patent No.: US 8,424,404 B2
(45) Date of Patent: Apr. 23, 2013

(54) EIGHT SPEED DUAL CLUTCH TRANSMISSIONS

(75) Inventors: Craig S. Ross, Ypsilanti, MI (US); Edward W. Mellet, Rochester Hills, MI (US); Scott H. Wittkopp, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 93 days.

(21) Appl. No.: 12/987,781

(22) Filed: Jan. 10, 2011

(65) Prior Publication Data

US 2012/0174703 A1   Jul. 12, 2012

(51) Int. Cl.
    *F16H 3/08* (2006.01)
(52) U.S. Cl.
    USPC .............. 74/340; 74/330; 74/331; 74/333
(58) Field of Classification Search .............. None
    See application file for complete search history.

(56) References Cited

U.S. PATENT DOCUMENTS

| | | | | |
|---|---|---|---|---|
| 4,116,090 A * | 9/1978 | Zenker | | 74/745 |
| 4,519,484 A * | 5/1985 | Nagaoka et al. | | 192/3.58 |
| 7,140,267 B2 * | 11/2006 | Haka | | 74/331 |
| 7,669,497 B2 * | 3/2010 | Borgerson et al. | | 74/340 |
| 7,752,934 B2 * | 7/2010 | Singh et al. | | 74/331 |
| 7,845,247 B2 * | 12/2010 | Olds et al. | | 74/333 |
| 8,166,842 B2 * | 5/2012 | Rieger | | 74/330 |
| 2007/0199393 A1 * | 8/2007 | Hattori | | 74/331 |
| 2008/0202265 A1 * | 8/2008 | Hendrickson et al. | | 74/331 |
| 2010/0257956 A1 * | 10/2010 | Rieger et al. | | 74/330 |
| 2010/0257957 A1 * | 10/2010 | Rieger et al. | | 74/330 |
| 2010/0257958 A1 * | 10/2010 | Rieger et al. | | 74/330 |
| 2010/0257965 A1 * | 10/2010 | Rieger et al. | | 74/331 |
| 2010/0257967 A1 * | 10/2010 | Rieger et al. | | 74/331 |
| 2010/0269611 A1 * | 10/2010 | Rieger | | 74/331 |
| 2011/0036186 A1 * | 2/2011 | Gumpoltsberger et al. | | 74/331 |
| 2011/0146445 A1 * | 6/2011 | Silva et al. | | 74/665 K |

* cited by examiner

*Primary Examiner* — Ha D Ho
*Assistant Examiner* — Valentin Craciun

(57) ABSTRACT

An eight forward speed dual clutch transmission includes a pair of input clutches which selectively provide drive torque to a pair of concentric input shafts. Gears coupled to and driven by the input shafts are in constant mesh with gears freely rotatably disposed on a pair of parallel countershafts or layshafts. A plurality of synchronizer clutches selectively synchronize and connect the various gears to the countershafts or layshafts to provide a desired gear ratio in the proper sequence. Reverse gear is similarly provided through a three gear gear train. Upon the synchronization and engagement of a particular gear, the associated input clutch is activated or engaged to supply drive torque to the input shaft, through the synchronized and engaged gear pair and out the countershaft or layshaft. An additional gear on each countershaft or layshaft engages a common gear that directly drives a differential which, in turn, drives a pair of drive axles.

7 Claims, 3 Drawing Sheets

EIGHT SPEED DUAL CLUTCH TRANSMISSIONS

FIELD

The present disclosure relates to dual clutch transmissions and more particularly to eight speed dual clutch transmissions.

BACKGROUND

The statements in this section merely provide background information related to the present disclosure and may or may not constitute prior art.

Dual clutch transmissions are a relatively recent addition to the stable of motor vehicle transmissions which previously included manual, continuously variable and automatic transmissions. Dual clutch transmissions or DCT's as they are now commonly known, combine good fuel economy with rapidly executed shifts. From a performance standpoint, therefore, they closely duplicate the feel and operation of a conventional mechanical transmission. Additionally, they may be configured to operate as an essentially automatic or manual transmission and thus exhibit exceptional versatility.

Structurally, dual clutch transmissions typically include an input shaft which drives a pair of mutually exclusively engaged input clutches. The input clutches drive a pair of countershafts which each include a plurality of gears freely rotatably disposed on the countershafts and associated synchronizer clutches. The pluralities of gears are in constant mesh with gears secured to an output shaft. Activation of a synchronizer clutch synchronizes and couples a selected gear to its countershaft. Then, the input clutch associated with that countershaft is engaged to transmit torque from the input shaft to the output shaft. Because clutches, gears and synchronizers are disposed or stacked along the countershafts, the axial length of dual clutch transmissions can create packaging issues, particularly in smaller vehicles.

SUMMARY

The present invention provides three eight forward speed dual clutch transmissions especially adapted to front wheel drive (FWD) applications. A pair of input clutches selectively provide drive torque to a pair of concentric input shafts. A first plurality of gears coupled to and driven by the first input shaft are in constant mesh with gears freely rotatably disposed on a first parallel countershaft or layshaft and a second parallel countershaft or layshaft. A second plurality of gears coupled to and driven by the second input shaft are in constant mesh with gears freely rotatably disposed on the first countershaft or layshaft and the second countershaft or layshaft. The countershafts or layshafts essentially function as the output shafts of the transmission. A plurality of synchronizer clutches disposed on the countershafts or layshafts adjacent the gears selectively synchronize and connect the various gears to the countershafts or layshafts to provide a desired gear ratio. Reverse gear is similar and is provided through a gear train having three gears rather than two. Upon the synchronization and engagement of a particular gear to its countershaft or layshaft, the associated input clutch is activated or engaged to supply drive torque to the input shaft, through the synchronized and engaged gear pair and out the countershaft or layshaft. An additional gear on each countershaft or layshaft engages a common gear that directly drives a differential which, in turn, drives a pair of drive axles.

It is thus an aspect of the present invention to provide an eight forward speed dual clutch transmission.

It is a further aspect of the present invention to provide a dual clutch transmission having eight forward speeds or gear ratios and reverse.

It is a still further aspect of the present invention to provide a dual clutch transmission having a first clutch selectively driving a first input shaft and a second clutch selectively driving a second input shaft.

It is a still further aspect of the present invention to provide a dual clutch transmission having a first input shaft driving a plurality of gears, a plurality of gears on a first countershaft meshing with a respective one of said plurality of gears on the first input shaft and a plurality of gears on a second countershaft meshing with a respective one of said plurality of gears on the first input shaft.

It is a still further aspect of the present invention to provide a dual clutch transmission having a second input shaft driving a plurality of gears, a plurality of gears on a first countershaft meshing with a respective one of said plurality of gears on the second input shaft and a plurality of gears on a second countershaft meshing with a respective one of said plurality of gears on the second input shaft.

It is a still further aspect of the present invention to provide a dual clutch transmission having a plurality of freely rotating gears disposed on a first countershaft and a second countershaft.

It is a still further aspect of the present invention to provide a dual clutch transmission having a plurality of freely rotating gears disposed on a first countershaft and a second countershaft and a synchronizer clutch disposed adjacent the plurality of gears.

It is a still further aspect of the present invention to provide a dual clutch transmission having a gear driven by an input shaft, an idler gear meshing with the driven gear, a gear freely rotatably disposed on a countershaft and meshing with the idler gear and a synchronizer clutch disposed on the countershaft adjacent the freely rotatably disposed gear.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
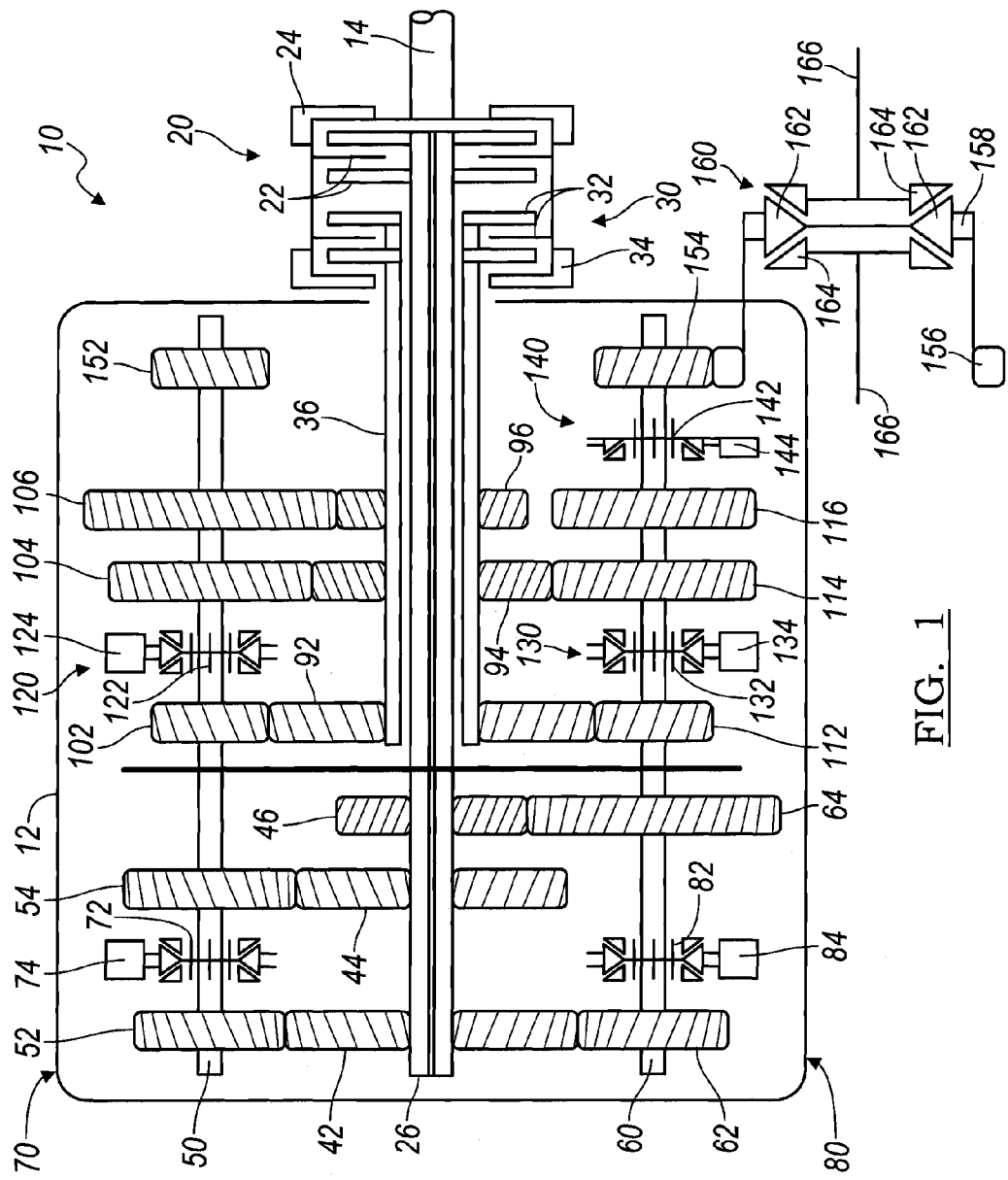
FIG. 1 is a schematic plan layout of a first embodiment of an eight speed dual clutch transmission according to the present invention.

With reference now to FIG. 1, an eight forward speed or gear ratio dual clutch transmission is illustrated schematically and generally designated by the reference number 10. The dual clutch transmission 10 includes a housing 12 which defines flanges, openings, bores, shoulders, recesses and the like which receive, support, enclose and protect the various components of the transmission 10. The transmission 10 includes a main input shaft 14 which is driven by a gasoline, flex-fuel, Diesel, hybrid or electric engine, prime mover or power source. The main input shaft 14 drives a first input clutch 20 having one or more friction members 22 and a first actuator 24 which selectively drives a first input shaft or member 26. The main input shaft 14 also drives a second input clutch 30 having one or more friction members 32 and a second actuator 34 which selectively drives a second input shaft, quill or member 36. Preferably, the second input shaft, quill or member 36 is disposed concentrically about the first input shaft or member 26.

The first input shaft or member 26 is also longer than the second input shaft, quill or member 36 and on its end opposite the first input clutch 20 are a first, larger drive gear 42, an axially spaced apart second, intermediate size drive gear 44 and an axially spaced apart third, smaller drive gear 46 which are all coupled to and driven by the first input shaft or member 26.

Disposed parallel to the axis of the first input shaft 26 and the second input member 36 are a first countershaft or layshaft 50 and a second countershaft or layshaft 60. It will be appreciated that for reasons of clarity and explanation, the first and second countershafts or layshafts 50 and 60 have been rotated out of position and into the plane of FIG. 1. A first driven gear 52 is freely rotatably disposed on the first countershaft or layshaft 50 and is in constant mesh with the first, larger drive gear 42. A second driven gear 54 is freely rotatably disposed on the first countershaft or layshaft 50 and is in constant mesh with the second, intermediate size drive gear 44. A third driven gear 62 is freely rotatably disposed on the second countershaft or layshaft 60 and is in constant mesh with the first, larger drive gear 42. A fourth driven gear 64 is freely rotatably disposed on the second countershaft or layshaft 60 and is in constant mesh with the third, smaller drive gear 46.

A first double synchronizer clutch assembly 70 is disposed intermediate the first driven gear 52 and the second driven gear 54 and is rotationally coupled to the first countershaft or layshaft 50 by an interengaging spline set 72. The output of a first three position actuator 74, which may be hydraulic, electric or pneumatic, is connected to the first double synchronizer clutch assembly 70 through a shift fork (not illustrated) and selectively translates the first double synchronizer clutch assembly 70 between a first position in which it synchronizes and then connects the first driven gear 52 to the first countershaft or layshaft 50, a second, middle or neutral position wherein no gear is connected to the first countershaft or layshaft 50 and a third position in which it synchronizes and then connects the second driven gear 54 to the first countershaft or layshaft 50.

A second double synchronizer clutch assembly 80 is disposed intermediate the third driven gear 62 and the fourth driven gear 64 and is rotationally coupled to the second countershaft or layshaft 60 by an interengaging spline set 82. The output of a second three position actuator 84, which may be hydraulic, electric or pneumatic, is connected to the second double synchronizer clutch assembly 80 through a shift fork (not illustrated) and selectively translates the second double synchronizer clutch assembly 80 between a first position in which it synchronizes and then connects the third driven gear 62 to the second countershaft or layshaft 60, a second, middle or neutral position wherein no gear is connected to the second countershaft or layshaft 60 and a third position in which it synchronizes and then connects the fourth driven gear 64 to the second countershaft or layshaft 60.

In this configuration, the first embodiment, first gear (the highest speed reduction) is achieved by engagement of the fourth driven gear 64, third gear is achieved by engagement of the second driven gear 54, fifth gear is achieved by engagement of third driven gear 62 and seventh gear is achieved by engagement of first driven gear 52.

The dual clutch transmission of the present invention includes a second, right portion (as illustrated in FIG. 1) which provides even numbered gears and reverse and which is structurally and operationally similar to the first, left portion described directly above which provides odd numbered gears. Thus, on the second input shaft, quill or member 36 are a fourth, larger drive gear 92, an axially spaced apart fifth, intermediate size drive gear 94 and an axially spaced apart sixth, smaller drive gear 96 which are all coupled to and driven by the second input shaft, quill or member 36.

A fifth driven gear 102 is freely rotatably disposed on the first countershaft or layshaft 50 and is in constant mesh with the fourth, larger drive gear 92. A sixth driven gear 104 is freely rotatably disposed on the first countershaft or layshaft 50 and is in constant mesh with the fifth, intermediate drive gear 94. A seventh driven gear 106 is freely rotatably disposed on the first countershaft or layshaft 50 and is in constant mesh with the sixth, smaller drive gear 96.

An eighth driven gear 112 is freely rotatably disposed on the second countershaft or layshaft 60 and is in constant mesh with the fourth, larger drive gear 92. A ninth driven gear 114 is freely rotatably disposed on the second countershaft or layshaft 60 and is in constant mesh with the fifth, intermediate size drive gear 94. A tenth driven gear 116 is freely rotatably disposed on the second countershaft or layshaft 60 and is in constant mesh with the seventh, driven gear 106 disposed on the first countershaft or layshaft 50. The tenth driven gear 116, since it is the final gear of a gear train comprising three gears (96, 106 and 116) rather than two, rotates in the opposite direction relative to the final (driven) gears of all the other gear trains and thus provides reverse.

A third double synchronizer clutch assembly 120 is disposed intermediate the fifth driven gear 102 and the sixth driven gear 104 and is rotationally coupled to the first countershaft or layshaft 50 by an interengaging spline set 122. The output of a third three position actuator 124, which may be hydraulic, electric or pneumatic, is connected to the third double synchronizer clutch assembly 120 through a shift fork (not illustrated) and selectively translates the third double synchronizer clutch assembly 120 between a first position in which it synchronizes and then connects the fifth driven gear 102 to the first countershaft or layshaft 50, a second, middle or neutral position wherein no gear is connected to the first countershaft or layshaft 50 and a third position in which it synchronizes and then connects the sixth driven gear 104 to the first countershaft or layshaft 50.

A fourth double synchronizer clutch assembly 130 is disposed intermediate the eighth driven gear 112 and the ninth driven gear 114 and is rotationally coupled to the second countershaft or layshaft 60 by an interengaging spline set 132. The output of a fourth three position actuator 134, which may be hydraulic, electric or pneumatic, is connected to the fourth double synchronizer clutch assembly 130 through a shift fork (not illustrated) and selectively translates the second double synchronizer clutch assembly 130 between a first position in which it synchronizes and then connects the eighth driven gear 112 to the second countershaft or layshaft 60, a second, middle or neutral position wherein no gear is connected to the second countershaft or layshaft 60 and a third position in which it synchronizes and then connects the ninth driven gear 114 to the second countershaft or layshaft 60.

A fifth synchronizer clutch assembly 140, which is a single clutch and synchronizer assembly, is disposed adjacent the tenth driven gear 116 and is rotationally coupled to the second countershaft or layshaft 60 by an interengaging spline set 142. The output of a two position actuator 144, which may be hydraulic, electric or pneumatic, is connected to the fifth synchronizer clutch assembly 140 through a shift fork (not illustrated) and selectively translates the fifth synchronizer clutch assembly 140 between a first position in which it synchronizes and then connects the tenth driven gear 116 to the second countershaft or layshaft 60 and a second, neutral position wherein the tenth driven gear 116 is free to rotate on the second countershaft or layshaft 60.

In this configuration, the first embodiment, second gear is achieved by engagement of the ninth driven gear 114, fourth gear is achieved by engagement of the sixth driven gear 104, sixth gear is achieved by engagement of the eighth driven gear 112, eighth gear is achieved by engagement of the fifth driven gear 102 and reverse is achieved by engagement of the tenth driven gear 116.

Coupled to the first countershaft or layshaft 50 and the second countershaft or layshaft 60 and in alignment along the axes of the first countershaft or layshaft 50 and the second countershaft or layshaft 60 are, respectively, a first output gear 152 and a second output gear 154. The output gears 152 and 154 are both in constant mesh with a ring gear 156 which is disposed about and directly drives a cage or housing 158 of a differential assembly 160. The differential assembly 160 includes a pair of opposed idler gears 162 and a constantly meshed pair of output gears 164 that are coupled to and drive a respective pair of axles 166.

Figure 2:
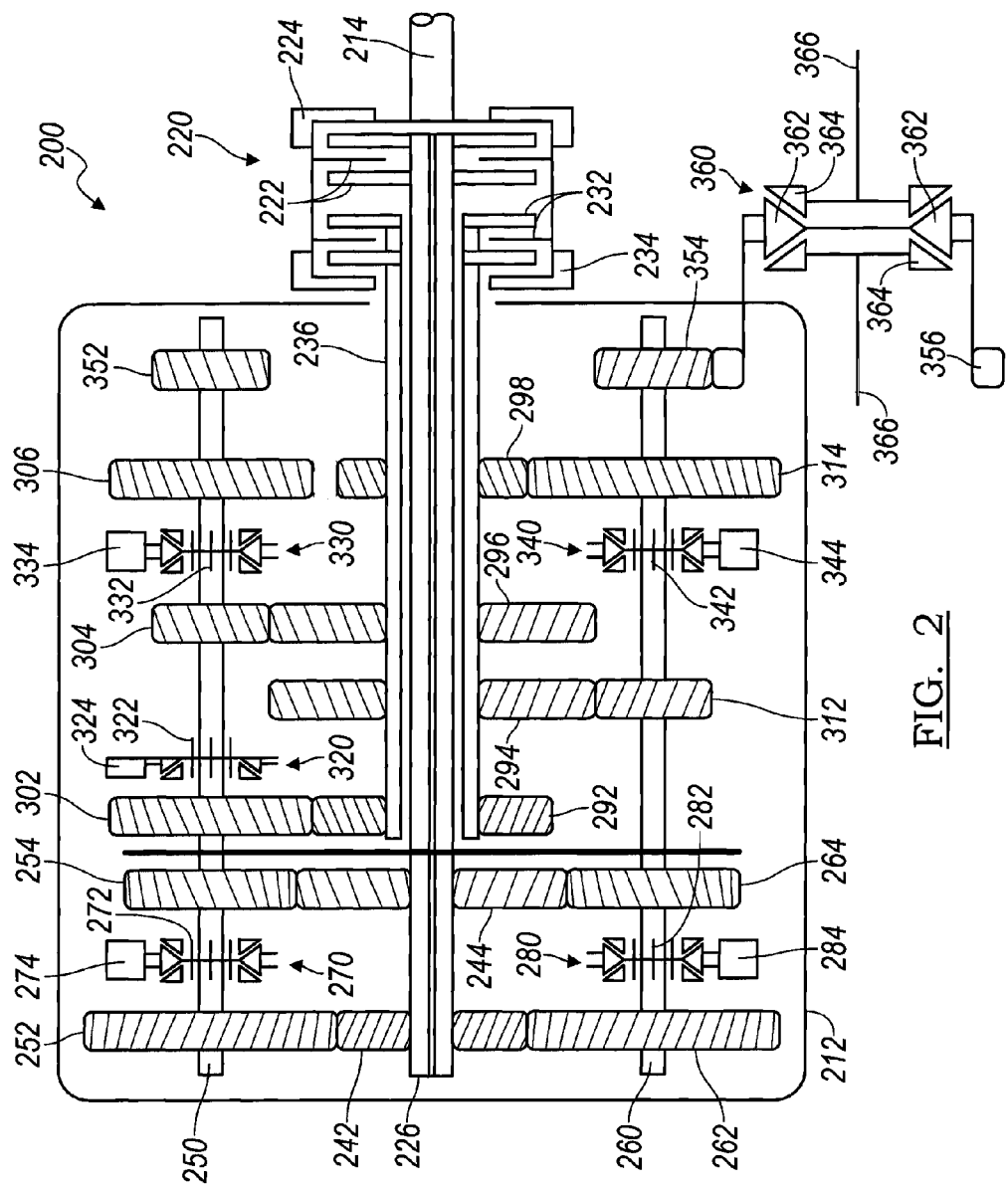
FIG. 2 is a schematic plan layout of a second embodiment of an eight speed dual clutch transmission according to the present invention.

Referring now to FIG. 2, a second embodiment of an eight speed dual clutch transmission according to the present invention is illustrated and generally designated by the reference number 200. The dual clutch transmission 200 includes a housing 212 which defines flanges, openings, bores, shoulders, recesses and the like which receive, support, enclose and protect the various components of the transmission 200. The transmission 200 includes a main input shaft 214 which is driven by a gasoline, flex-fuel, Diesel, hybrid or electric engine, prime mover or power source. The main input shaft 214 drives a first input clutch 220 having one or more friction members 222 and a first actuator 224 which selectively drives a first input shaft or member 226. The main input shaft 214 also drives a second input clutch 230 having one or more friction members 232 and a second actuator 234 which selectively drives a second input shaft, quill or member 236. Preferably, the second input shaft, quill or member 236 is disposed concentrically about the first input shaft or member 226.

The first input shaft or member 226 is longer than the second input shaft, quill or member 236 and on its end opposite the first input clutch 220 are a first, smaller drive gear 242 and an axially spaced apart second, larger drive gear 244 which are both coupled to and driven by the first input shaft or member 226.

Disposed parallel to the axis of the first input shaft 226 and the second input member 236 are a first countershaft or layshaft 250 and a second countershaft or layshaft 260. As presented in FIG. 1, the first and second countershafts or layshafts 250 and 260 have been rotated out of position and into the plane of FIG. 2 for reasons of clarity and explanation. A first, larger driven gear 252 is freely rotatably disposed on the first countershaft or layshaft 250 and is in constant mesh with the first, smaller drive gear 242. A second, smaller driven gear 254 is freely rotatably disposed on the first countershaft or layshaft 250 and is in constant mesh with the second, larger drive gear 244. A third, larger driven gear 262 is freely rotatably disposed on the second countershaft or layshaft 260 and is in constant mesh with the first, smaller drive gear 242. A fourth, smaller driven gear 264 is freely rotatably disposed on the second countershaft or layshaft 260 and is in constant mesh with the second, larger drive gear 244.

A first double synchronizer clutch assembly 270 is disposed intermediate the first, larger driven gear 252 and the second, smaller driven gear 254 and is rotationally coupled to the first countershaft or layshaft 250 by an interengaging spline set 272. The output of a first three position actuator 274, which may be hydraulic, electric or pneumatic, is connected to the first double synchronizer clutch assembly 270 through a shift fork (not illustrated) and selectively translates the first double synchronizer clutch assembly 270 between a first position in which it synchronizes and then connects the first, larger driven gear 252 to the first countershaft or layshaft 250, a second, middle or neutral position wherein no gear is connected to the first countershaft or layshaft 250 and a third position in which it synchronizes and then connects the second, smaller driven gear 254 to the first countershaft or layshaft 250.

A second double synchronizer clutch assembly 280 is disposed intermediate the third, larger driven gear 262 and the fourth, smaller driven gear 264 and is rotationally coupled to the second countershaft or layshaft 260 by an interengaging spline set 282. The output of a second three position actuator 284, which may be hydraulic, electric or pneumatic, is connected to the second double synchronizer clutch assembly 280 through a shift fork (not illustrated) and selectively translates the second double synchronizer clutch assembly 280 between a first position in which it synchronizes and then connects the third, larger driven gear 262 to the second countershaft or layshaft 260, a second, middle or neutral position wherein no gear is connected to the second countershaft or layshaft 260 and a third position in which it synchronizes and then connects the fourth, smaller driven gear 264 to the second countershaft or layshaft 260.

In this configuration, the second embodiment transmission 200, first gear (the highest speed reduction) is achieved by engagement of the third, larger driven gear 262, third gear is achieved by engagement of the first, larger driven gear 252, fifth gear is achieved by engagement of fourth, smaller driven gear 264 and seventh gear is achieved by engagement of second, smaller driven gear 254.

The dual clutch transmission of the present invention includes a second, right portion (as illustrated in FIG. 2) which provides even numbered gears and reverse and which is structurally and operationally similar to the first, left portion described directly above which provides odd numbered gears. Thus, on the second input shaft, quill or member 236 are a third, intermediate size drive gear 292, an axially spaced apart fourth, intermediate size drive gear 294, an axially spaced apart fifth, larger drive gear 296 and an axially spaced apart sixth, smaller drive gear 298 which are all coupled to and driven by the second input shaft, quill or member 236.

A fifth driven gear 302 is freely rotatably disposed on the first countershaft or layshaft 250 and is in constant mesh with the third, intermediate size drive gear 292. A sixth driven gear 304 is freely rotatably disposed on the first countershaft or layshaft 250 and is in constant mesh with the fifth, larger drive gear 296. A seventh driven gear 306 is freely rotatably disposed on the first countershaft or layshaft 250.

An eighth driven gear 312 is freely rotatably disposed on the second countershaft or layshaft 260 and is in constant mesh with the fourth, intermediate size drive gear 294. A ninth driven gear 314 is freely rotatably disposed on the second countershaft or layshaft 260 and is in constant mesh with the sixth, smaller drive gear 298 and the seventh driven gear 306. The seventh driven gear 306, since it is the final gear of a gear train comprising three gears (298, 314 and 306) rather than two, rotates in the opposite direction relative to the driven gears of all the other gear trains and thus provides reverse.

A third synchronizer clutch assembly 320, which is a single clutch and synchronizer assembly, is disposed adjacent the fifth driven gear 302 and is rotationally coupled to the first countershaft or layshaft 250 by an interengaging spline set 322. The output of a first two position actuator 324, which may be hydraulic, electric or pneumatic, is connected to the third synchronizer clutch assembly 320 through a shift fork (not illustrated) and selectively translates the third synchronizer clutch assembly 320 between a first position in which it synchronizes and then connects the fifth driven gear 302 to the first countershaft or layshaft 250 and a second, neutral position wherein the fifth driven gear 302 is free to rotate on the first countershaft or layshaft 250.

A fourth double synchronizer clutch assembly 330 is disposed intermediate the sixth driven gear 304 and the seventh driven gear 306 and is rotationally coupled to the first countershaft or layshaft 250 by an interengaging spline set 332. The output of a fourth three position actuator 334, which may be hydraulic, electric or pneumatic, is connected to the fourth double synchronizer clutch assembly 330 through a shift fork (not illustrated) and selectively translates the fourth double synchronizer clutch assembly 330 between a first position in which it synchronizes and then connects the sixth driven gear 304 to the first countershaft or layshaft 250, a second, middle or neutral position wherein no gear is connected to the first countershaft or layshaft 250 and a third position in which it synchronizes and then connects the seventh driven gear 306 to the first countershaft or layshaft 250.

A fifth double synchronizer clutch assembly 340 is disposed intermediate the eighth driven gear 312 and the ninth driven gear 314 and is rotationally coupled to the second countershaft or layshaft 260 by an interengaging spline set 342. The output of a fifth three position actuator 344, which may be hydraulic, electric or pneumatic, is connected to the fourth double synchronizer clutch assembly 340 through a shift fork (not illustrated) and selectively translates the fifth double synchronizer clutch assembly 340 between a first position in which it synchronizes and then connects the eighth driven gear 312 to the second countershaft or layshaft 260, a second, middle or neutral position wherein no gear is connected to the second countershaft or layshaft 260 and a third position in which it synchronizes and then connects the ninth driven gear 314 to the second countershaft or layshaft 260.

In this configuration, the second embodiment transmission 200, second gear is achieved by engagement of the ninth driven gear 314, fourth gear is achieved by engagement of the fifth driven gear 302, sixth gear is achieved by engagement of the eighth driven gear 312, eighth gear is achieved by engagement of the sixth driven gear 304 and reverse is achieved by engagement of the seventh driven gear 306.

Coupled to the first countershaft or layshaft 250 and the second countershaft or layshaft 260 and in alignment along the axes of the first countershaft or layshaft 250 and the second countershaft or layshaft 260 are, respectively, a first output gear 352 and a second output gear 354. The output gears 352 and 354 are both in constant mesh with a ring gear 356 which is disposed about and directly drives a cage or housing 358 of a differential assembly 360. The differential assembly 360 includes a pair of opposed idler gears 362 and a constantly meshed pair of output gears 364 that are coupled to and drive a respective pair of axles 366.

Figure 3:
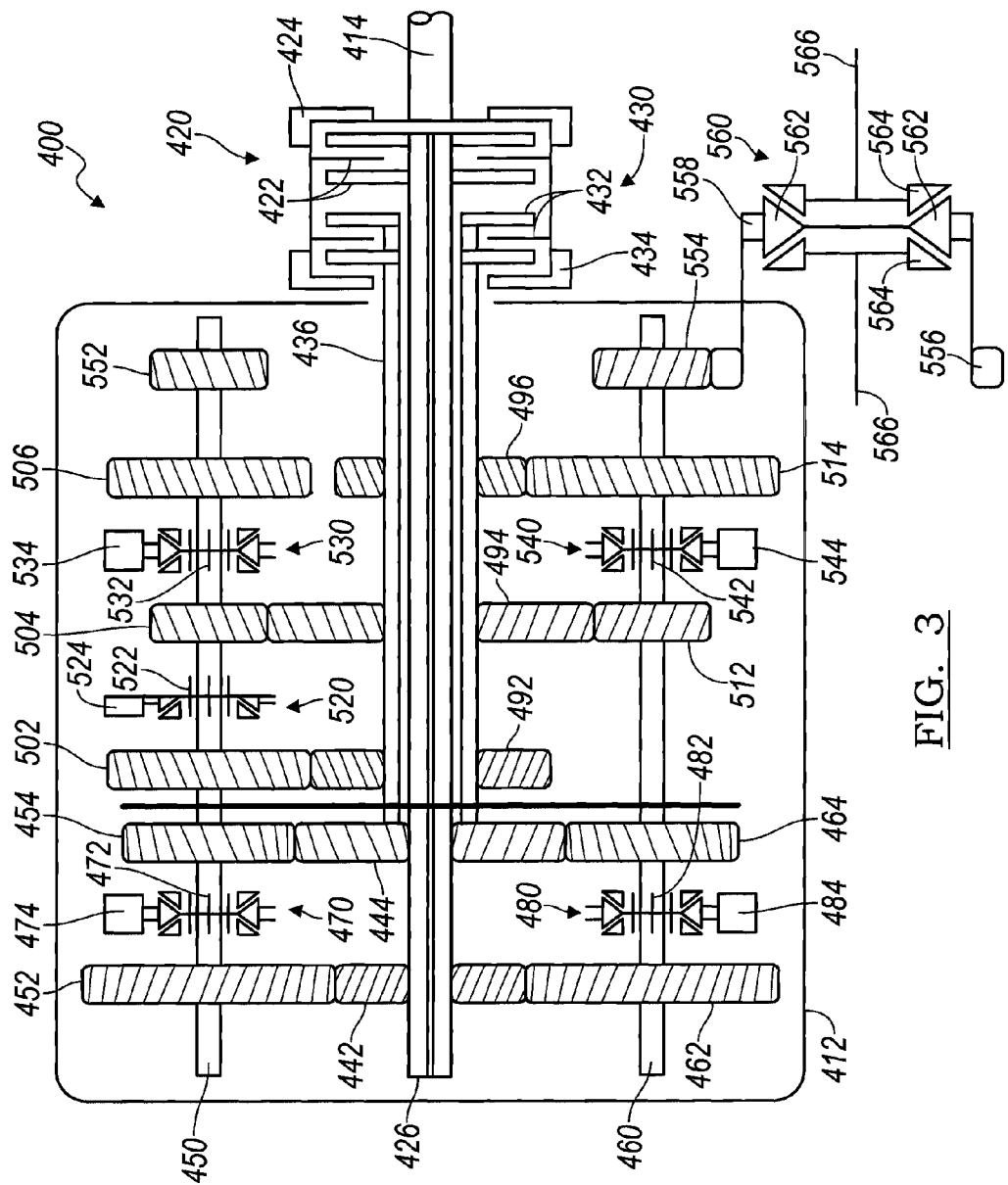
FIG. 3 is a schematic plan layout of a third embodiment of an eight speed dual clutch transmission according to the present invention.

Referring now to FIG. 3, a third embodiment of an eight speed dual clutch transmission according to the present invention is illustrated and generally designated by the reference number 400. The dual clutch transmission 400 includes a housing 412 which defines flanges, openings, bores, shoulders, recesses and the like which receive, support, enclose and protect the various components of the transmission 400. The transmission 400 includes a main input shaft 414 which is driven by a gasoline, flex-fuel, Diesel, hybrid or electric engine, prime mover or power source. The main input shaft 414 drives a first input clutch 420 having one or more friction members 422 and a first actuator 424 which selectively drives a first input shaft or member 426. The main input shaft 414 also drives a second input clutch 430 having one or more friction members 432 and a second actuator 434 which selectively drives a second input shaft, quill or member 436. Preferably, the second input shaft, quill or member 436 is disposed concentrically about the first input shaft or member 426.

The first input shaft or member 426 is longer than the second input shaft, quill or member 436 and on its end opposite the first input clutch 420 are a first, smaller drive gear 442 and an axially spaced apart second, larger drive gear 444 which are both coupled to and driven by the first input shaft or member 426.

Disposed parallel to the axis of the first input shaft 426 and the second input member 436 are a first countershaft or layshaft 450 and a second countershaft or layshaft 460. As they were presented in FIG. 1, the first and second countershafts or layshafts 450 and 460 have been rotated out of position and into the plane of FIG. 3 for reasons of clarity and explanation. A first, larger driven gear 452 is freely rotatably disposed on the first countershaft or layshaft 450 and is in constant mesh with the first, smaller drive gear 442. A second, smaller driven gear 454 is freely rotatably disposed on the first countershaft or layshaft 450 and is in constant mesh with the second, larger drive gear 444. A third, larger driven gear 462 is freely rotatably disposed on the second countershaft or layshaft 460 and is in constant mesh with the first, smaller drive gear 442. A fourth, smaller driven gear 464 is freely rotatably disposed on the second countershaft or layshaft 460 and is in constant mesh with the second, larger drive gear 444.

A first double synchronizer clutch assembly 470 is disposed intermediate the first, larger driven gear 452 and the second, smaller driven gear 454 and is rotationally coupled to the first countershaft or layshaft 450 by an interengaging spline set 472. The output of a first three position actuator 474, which may be hydraulic, electric or pneumatic, is connected to the first double synchronizer clutch assembly 470 through a shift fork (not illustrated) and selectively translates the first double synchronizer clutch assembly 470 between a first position in which it synchronizes and then connects the first, larger driven gear 452 to the first countershaft or layshaft 450, a second, middle or neutral position wherein no gear is connected to the first countershaft or layshaft 450 and a third position in which it synchronizes and then connects the second, smaller driven gear 454 to the first countershaft or layshaft 450.

A second double synchronizer clutch assembly 480 is disposed intermediate the third, larger driven gear 462 and the fourth, smaller driven gear 464 and is rotationally coupled to the second countershaft or layshaft 460 by an interengaging spline set 482. The output of a second three position actuator 484, which may be hydraulic, electric or pneumatic, is connected to the second double synchronizer clutch assembly 480 through a shift fork (not illustrated) and selectively translates the second double synchronizer clutch assembly 480 between a first position in which it synchronizes and then connects the third, larger driven gear 462 to the second countershaft or layshaft 460, a second, middle or neutral position wherein no gear is connected to the second countershaft or layshaft 460 and a third position in which it synchronizes and then connects the fourth, smaller driven gear 464 to the second countershaft or layshaft 460.

In this configuration, the third embodiment transmission 400, first gear (the highest speed reduction) is achieved by engagement of the third, larger driven gear 462, third gear is achieved by engagement of the first, larger driven gear 452, fifth gear is achieved by engagement of fourth, smaller driven gear 464 and seventh gear is achieved by engagement of second, smaller driven gear 454.

The dual clutch transmission of the present invention includes a second, right portion (as illustrated in FIG. 3) which provides even numbered gears and reverse and which is structurally and operationally similar to the first, left portion described directly above which provides odd numbered gears. Thus, on the second input shaft, quill or member 436 are a third, intermediate size drive gear 492, an axially spaced apart fourth, larger drive gear 494 and an axially spaced apart fifth, smaller drive gear 496 which are all coupled to and driven by the second input shaft, quill or member 436.

A fifth driven gear 502 is freely rotatably disposed on the first countershaft or layshaft 450 and is in constant mesh with the third, intermediate size drive gear 492. A sixth driven gear 504 is freely rotatably disposed on the first countershaft or layshaft 450 and is in constant mesh with the fifth, larger drive gear 496. A seventh driven gear 506 is freely rotatably disposed on the first countershaft or layshaft 450.

An eighth driven gear 512 is freely rotatably disposed on the second countershaft or layshaft 460 and is in constant mesh with the fourth intermediate size drive gear 494. A ninth driven gear 514 is freely rotatably disposed on the second countershaft or layshaft 460 and is in constant mesh with the fifth, smaller drive gear 496 and the seventh driven gear 506. The seventh driven gear 506, since it is the final gear of a gear train comprising three gears (496, 514 and 506) rather than two, rotates in the opposite direction relative to all the driven gears of all the other gear trains and thus provides reverse.

A third synchronizer clutch assembly 520, which is a single clutch and synchronizer assembly, is disposed adjacent the fifth driven gear 502 and is rotationally coupled to the first countershaft or layshaft 450 by an interengaging spline set 522. The output of a first two position actuator 524, which may be hydraulic, electric or pneumatic, is connected to the third synchronizer clutch assembly 520 through a shift fork (not illustrated) and selectively translates the third synchronizer clutch assembly 520 between a first position in which it synchronizes and then connects the fifth driven gear 502 to the first countershaft or layshaft 450 and a second, neutral position wherein the fifth driven gear 502 is free to rotate on the first countershaft or layshaft 450.

A fourth double synchronizer clutch assembly 530 is disposed intermediate the sixth driven gear 504 and the seventh driven gear 506 and is rotationally coupled to the first countershaft or layshaft 450 by an interengaging spline set 532. The output of a fourth three position actuator 534, which may be hydraulic, electric or pneumatic, is connected to the fourth double synchronizer clutch assembly 530 through a shift fork (not illustrated) and selectively translates the fourth double synchronizer clutch assembly 530 between a first position in which it synchronizes and then connects the sixth driven gear 504 to the first countershaft or layshaft 450, a second, middle or neutral position wherein no gear is connected to the first countershaft or layshaft 450 and a third position in which it synchronizes and then connects the seventh driven gear 506 to the first countershaft or layshaft 450.

A fifth double synchronizer clutch assembly 540 is disposed intermediate the eighth driven gear 512 and the ninth driven gear 514 and is rotationally coupled to the second countershaft or layshaft 460 by an interengaging spline set 542. The output of a fifth three position actuator 544, which may be hydraulic, electric or pneumatic, is connected to the fourth double synchronizer clutch assembly 540 through a shift fork (not illustrated) and selectively translates the fifth double synchronizer clutch assembly 540 between a first position in which it synchronizes and then connects the eighth driven gear 512 to the second countershaft or layshaft 460, a second, middle or neutral position wherein no gear is connected to the second countershaft or layshaft 460 and a third position in which it synchronizes and then connects the ninth driven gear 514 to the second countershaft or layshaft 460.

In this configuration, the third embodiment 400, second gear is achieved by engagement of the ninth driven gear 514, fourth gear is achieved by engagement of the fifth driven gear 502, sixth gear is achieved by engagement of the eighth driven gear 512, eighth gear is achieved by engagement of the sixth driven gear 504 and reverse is achieved by engagement of the seventh driven gear 506.

Coupled to the first countershaft or layshaft 450 and the second countershaft or layshaft 460 and in alignment along the axes of the first countershaft or layshaft 450 and the second countershaft or layshaft 460 are, respectively, a first output gear 552 and a second output gear 554. The output gears 552 and 554 are both in constant mesh with a ring gear 556 which is disposed about and directly drives a cage or housing 558 of a differential assembly 560. The differential assembly 560 includes a pair of opposed idler gears 562 and a constantly meshed pair of output gears 564 that are coupled to and drive a respective pair of axles 566.

The description of the invention is merely exemplary in nature and variations that do not depart from the gist of the invention are intended to be within the scope of the invention. Such variations are not to be regarded as a departure from the spirit and scope of the invention.

What is claimed is:

1. An eight speed dual clutch transmission comprising, in combination,
   a first clutch having an input adapted to be driven by a prime mover and a first output coupled to a first drive member,
   a first gear, a second gear and a third gear coupled to and driven by said first drive member,
   a second clutch having an input adapted to be driven by said prime mover and a second output coupled to a second drive member,
   a fourth gear, a fifth gear and a sixth gear coupled to and driven by said second drive member,
   a first countershaft and a second countershaft spaced from and parallel to said first countershaft,
   a first pair of driven gears disposed on said first countershaft and meshing with said first and said second gears on said first drive member,
   a first synchronizer clutch disposed between said first pair of driven gears for selectively synchronizing and connecting one of said first pair of driven gears to said first countershaft, a second pair of driven gears disposed on said second countershaft and meshing with said first and said third gears on said first drive member, a second synchronizer clutch disposed between said second pair of driven gears for selectively synchronizing and connecting one of said second pair of driven gears to said second countershaft, a third pair of driven gears disposed on said first countershaft and meshing with said fourth and said fifth gears on said second drive member, a third synchronizer clutch disposed between said third pair of driven gears for selectively synchronizing and connecting one of said third pair of driven gears to said first countershaft, a fourth pair of driven gears disposed on said second countershaft and meshing with said fourth and said fifth gears on said second drive member, a fourth synchronizer clutch disposed between said fourth pair of driven gears for selectively synchronizing and connecting one of said fourth pair of driven gears to said second countershaft, a first additional driven gear disposed on one of said countershafts and meshing with said sixth gear, a second additional gear disposed on another of said countershafts and meshing with said first additional gear, and a fifth synchronizer clutch disposed adjacent said second additional gear for selectively synchronizing and connecting said second additional gear to said another of said countershafts.

2. The eight speed dual clutch transmission of claim 1 further including a three position shift actuator operably associated with each of said synchronizer clutches.

3. The eight speed dual clutch transmission of claim 1 further including an output gear coupled to each of said countershafts, said output gears in constant mesh with a gear coupled to a differential assembly.

4. The eight speed dual clutch transmission of claim 1 further including a differential assembly commonly driven by said countershafts and a pair of axles driven by said differential assembly.

5. The eight speed dual clutch transmission of claim 1 wherein said first additional gear is disposed on said first countershaft and driven by said sixth gear, and said first additional gear is in constant mesh with said second additional gear disposed on one of said second countershaft.

6. The eight speed dual clutch transmission of claim 1 wherein said first and said second pair of driven gears provide odd numbered gears and said third and said fourth pair of driven gears provide even numbered gears and reverse.

7. The eight speed dual clutch transmission of claim 1 wherein odd numbered speed ratios are provided by gears associated with said first drive member and even numbered speed ratios and reverse are provided by gears associated with said second drive member.

* * * * *